United States Patent [19]
Schumaker

[11] Patent Number: 6,124,963
[45] Date of Patent: Sep. 26, 2000

[54] SUPRAMOLECULAR OPTO-ELECTRONIC ARCHITECTURE OF TAUTOMERIC COMPOSITIONS

[75] Inventor: Robert R. Schumaker, Los Gatos, Calif.

[73] Assignee: California Molecular Electronics, Corp., San Jose, Calif.

[21] Appl. No.: 09/274,754

[22] Filed: Mar. 23, 1999

[51] Int. Cl.$^7$ .............................. G02B 26/08; G02F 1/35
[52] U.S. Cl. ......................... 359/245; 359/244; 359/326
[58] Field of Search .................... 359/244–246, 359/326; 428/411.1; 528/170

[56] References Cited

U.S. PATENT DOCUMENTS 5,237,067  8/1993  Schumaker ............................. 546/187

OTHER PUBLICATIONS

Salem, "Narcissistic Reactions: Synchronism vs. Nonsynchronism in Automerizations and Enantiomerizations", *Accounts of Chemical Research*, vol. 4, pp. 322–328, Sep. 1971.

Chang, "Biological Membranes", *Physical Chemistry with Applications to Biological Systems*, 2$^{nd}$ Ed., Ch. 9.6, pp. 221–222 (1981).

Streetman, "Fiber Optic Communications", *Solid State Electronic Devices*, 3$^{rd}$ Ed., Chapter 6.4.2, pp. 24–225, (1990).

Marhic, "Storage Limit Of Two–Photon–Based Three–Dimensional Memories With Parallel Access", *Optics Letters*, vol. 16, No. 16, pp. 1272–1273, Aug. 15, 1991.

Carts–Powell, "Cholesteric LCDs Show Images After Power is Turned Off", *Laser Focus World*, pp. 100–103, Sep. 1998.

Solladie et al, "Liquid Crystals: A Tool for Studies on Chirality", *A Chem. Int. Ed. Eng.*, vol. 23, p. 348 (1984).

Rau, "Asymmetric Photochemistry in Solution", *Chem. Rev.*, vol. 83, pp. 535–547, Jan. 31, 1983.

*Primary Examiner*—Scott J Sugarman
*Assistant Examiner*—Michael A Lucas
*Attorney, Agent, or Firm*—Benman & Collins

[57] ABSTRACT

A procedure is disclosed for assembly of novel two-sided monolayer or multilayer device architectures out of self-assembly or self-organizing amphiphilic compounds derived from molecules that undergo a type of valence tautomerization known as asymmetric narcissistic reactions. The two-sided monolayer architectures are constructed by Langmuir-Blodgett (LB) transfer or self-assembly (SA) techniques while the multilayer architectures are formed by Y-type LB depositions, where the two layers or bilayers of the assemblies are alternate depositions of mirror-image forms of the amphiphiles. The resulting three-dimensional supramolecular assemblies described herein are uniquely capable of commutation between two non-centrosymmetric states which have, on a macroscopic scale, an optically antipodal relationship and a third central symmetric state which is, accordingly, optically racemic. The inventive architectures are expected to be useful for constructing a variety of opto-electronic devices for application as chemical sensors or for the transmission, modulation, storage, or processing of information.

33 Claims, 6 Drawing Sheets

X - Type

Z - Type

Y - Type

Alternating $n \xrightarrow{h\nu \text{ (polymerization)}} n$ fill media (M) →

SUPRAMOLECULAR OPTO-ELECTRONIC ARCHITECTURE OF TAUTOMERIC COMPOSITIONS

TECHNICAL FIELD

The present invention is directed to a method for constructing highly ordered three-dimensional assemblies from organic tautomeric compositions that, due to their novel architecture, can function as opto-electronic devices. More specifically, the present invention is directed to a detailed procedure by which asymmetric narcissistic molecules can be organized into multiple-layered Langrnuir-Blodgett type assemblies that are capable of commutation between three states, two of which are non- centrosymmetric arrays or domains that are optically antipodal while the third is central symmetric and optically racemic.

BACKGROUND ART

Methods have been developed for engineering molecular architectures based on the principles of self-assembly and self-organization. Self-assembly (SA) can be realized by hydrogen-bonding, coordination chemistry, π—π interactions and Van der Waals forces. Self-organization produces such diverse structures as liquid crystals, micelles self-assembly monolayers and Langmuir-Blodgett (LB) films. The LB film technique denotes monolayers and multilayers transferred from the water-air interface onto a solid substrate and offers relatively rapid construction with Angstrom (Å) level control of supramolecular assemblies of amphiphilic molecules where the resulting architecture depends on the shape and charge distribution of the molecules from which they are made. The LB and SA film techniques are reviewed in two books: *Langmuir-Blodgett Films*, Ed. by Gareth Roberts (1990) Plenum Press, N. Y.; and, *An Introduction to Ultrathin Organic Films: from Langmuir-Blodgett to Self-Assembly*, by Abraham Ulman (1991) Academic Press, Boston.

The LB ultra thin film method is particularly well suited for fabricating a variety of organically-based opto-electronic devices and in particular, integrated optical structures. Such applications necessitate: (1) that the optical component of the desired characteristic be incorporated into an amphiphilic molecule; (2) that a sufficient multilayer film thickness for proper device functioning be achieved and; (3) that the multilayer assembly satisfies any required arrangement of the functional opto-electronic component.

A relevant example of the LB film technique being utilized to construct an optical device is provided by $2^{nd}$-order non-linear optical (NLO) materials useful for second harmonic generation (SHG) in optical wave guided structures. For LB device fabrication, one needs first to prepare from the organic NLO material an amphiphilic molecule. Next, a multilayer film thickness of approximately 1 micron (em) for a wave guide structure, must be successfully deposited. And finally, the required arrangement for SHG of a non-centrosymmetric disposition of the polar NLO constituents, has to be achieved.

DISCLOSURE OF INVENTION

The present invention provides a procedure for assembly of novel two-sided monolayer or multilayer device architectures out of self-assembly or self-organizing amphiphilic compounds derived from molecules that undergo a type of valence tautomerization known as asymmetric narcissistic reactions. The two-sided monolayer architectures are constructed by Langmuir-Blodgett (LB) transfer or self-assembly (SA) techniques while the multilayer architectures are formed by Y-type LB depositions, where the two layers or bilayers of the assemblies are alternate depositions of mirror-image forms of the amphiphiles. The resulting three-dimensional supra-molecular assemblies disclosed herein are uniquely capable of commutation between two non-centrosymmetric states which have, on a macroscopic scale, an optically antipodal relationship and a third central symmetric state which is, accordingly, optically racemic. The inventive architectures are expected to be useful for constructing a variety of opto-electronic devices for application as chemical sensors or for the transmission, modulation, storage, or processing of information.

The present invention is directed to LB and SA structures derived from asymmetric narcissistic molecules which are a relatively unexplored class of materials that undergo reactions described by Lionel Salem, "Narcissistic Reactions: Synchronism vs. Nonsynchronism in Automerizations and Enantiomerizations", *Journal of Accounts of Chemical Research*, Vol. 4, pp. 322–328 (1971). A particular subset of asymmetric narcissistic molecules and their usefulness as opto-electronic tautomeric compositions has already been described by U.S. Pat. No. 5,237,067, "Optoelectronic Tautomeric Compositions, issued Aug. 17, 1993, to the present inventor.

In accordance with the present invention, an optoelectronic device is provided, comprising at least one two-sided monolayer structure or comprising a bilayer structure comprised of amphiphilic compounds that are based on molecules that undergo asymmetric narcissistic reactions so that the structure may be commuted between two non-centrosymmetric states.

Also in accordance with the present invention is a method of fabricating the optoelectronic device. The method comprises coating a major surface of each of two substrates with at least one monolayer and placing each major coated surface in opposed facing contact. Alternatively, the method comprises forming at least one bilayer structure on a major surface of a substrate.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

BEST MODES FOR CARRYING OUT THE INVENTION

Reference is now made in detail to a specific embodiment of the present invention, which illustrates the best mode presently contemplated by the inventor for practicing the invention. Alternative embodiments are also briefly described as applicable.

Figure 1:
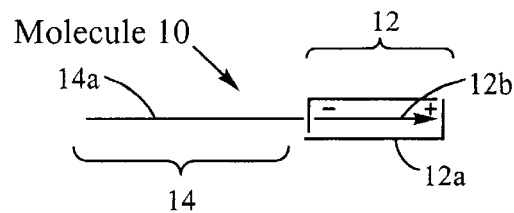
FIG. 1 is a schematic representation of an amphiphilic molecule having a hydrophilic "head" group, represented by an arrow that signifies the direction of a highly polar constituent, and a hydrophobic "tail" group, represented by a straight line that typically connotes an aliphatic chain.
Figure 2A:
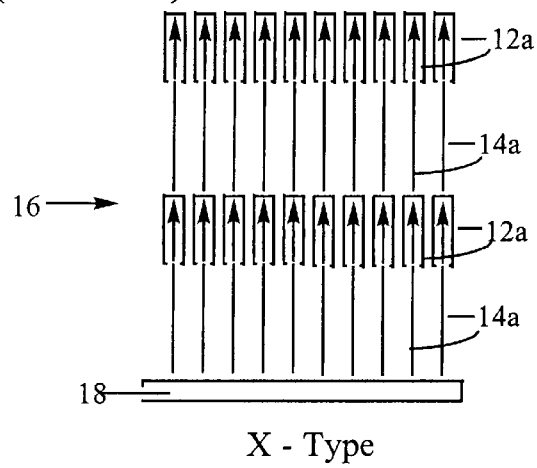
FIGS. 2A–2D depict various combinations, known in the prior art, of how polar multilayers of amphiphilic molecules (of FIG. 1) can be organized by sequential vertical deposition of LB monolayer films.
Figure 2B:
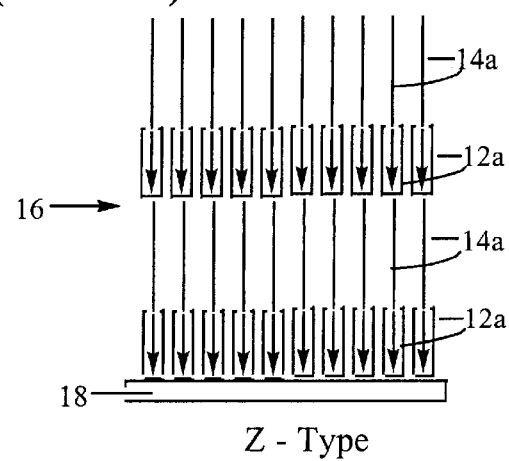
Figure 2C:
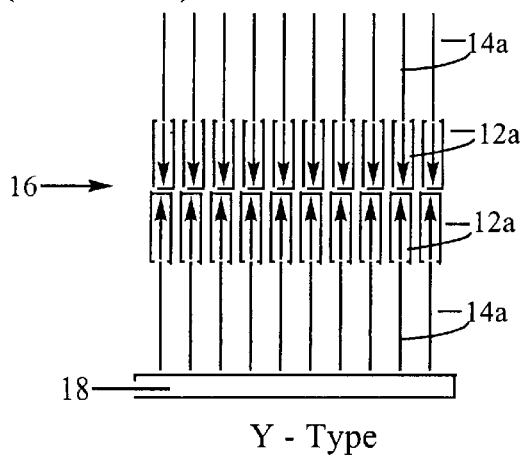
Figure 2D:
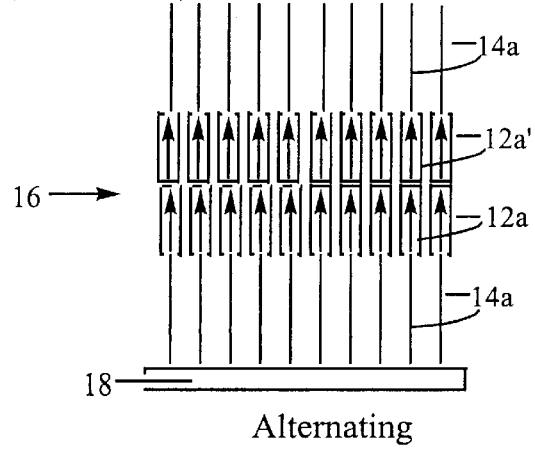

To illustrate the various possibilities of LB film deposition of NLO active materials, FIG. 1 depicts an amphiphilic molecule 10 composed of a hydrophilic 'head' group 12 represented in the Figure by a box 12a that incorporates an arrow 12b that signifies the dipole direction of a highly polar NLO constituent, and a hydrophobic 'tail' group 14 comprising an aliphatic chain represented by a straight line 14a.

In FIG. 2 is shown in a general fashion how polar multilayers of amphiphilic NLO molecules (as represented in FIG. 1) can be organized by sequential vertical deposition of LB monolayer films 16 on a substrate 18. FIGS. 2A and 2B show how a single component can be deposited in a head-to-tail arrangement of the molecules to afford the required non-centrosymmetric array (X-type and Z-type multilayers or [$\vec{A}\vec{A}$...]-film structures). Structures of these types do exhibit SHG that increases as the layers are built up, but due to the close contact of hydrophobic head groups and ali-phatic tails, the structures are difficult to prepare and are very often unstable toward rearrangement during preparation. FIG. 2C depicts a more stable head-to-head and tail-to-tail one-component multilayer (Y-type or [$\vec{A}\overleftarrow{A}$...]-film structure). The Y-type structure has the stable biological bilayer arrangement and Y-type multilayer films of several microns thickness have successfully been deposited. Unfortunately, the Y-type structure is centrosymmetric and thus not suitable for SHG. FIG. 2D displays a possible solution to this problem as an alternating multilayer (Y-type or [$\vec{A}\vec{B}$...]-film structure), prepared from two NLO components with opposing dipole moments. For this type of vertical film deposition, a dedicated two-compartment LB trough for alternating film deposition, one component on immersion (downstroke) and the other on immersion (upstroke), is utilized. LB films of this type also exhibit SHG but are difficult to prepare with sufficient thickness for applications such as wave guiding, since dipole-dipole repulsion increases with rising number of layers. To address this complication, another type of alternating multilayers (Y-type or [$\vec{A}\vec{B}$CC...]-film structure) where the active layers [$\vec{A}\vec{B}$] are separated by spacer layers [CC], which act as insulators for the local electric field, have been fabricated. Although successfully constructed, these three-component multilayers were extremely difficult to deposit and the concentration of the active component was diluted by the insulating layers.

Figure 3:
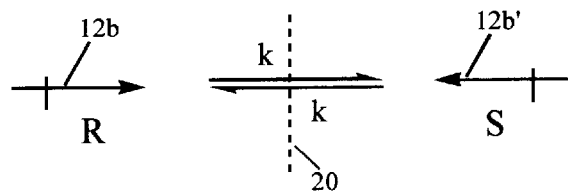
FIG. 3 is a schematic representation of a polar, asymmetric narcissistic molecule R that is capable of undergoing enantiomerization reaction equivalent to reflection in a mirror plane to form an enantiomer S.

For the purpose of the present disclosure, polar asymmetric narcissistic molecules are represented by unevenly crossed arrows in which the arrow signifies the molecular dipole and the uneven cross the molecular asymmetry in two-dimensions. Such molecules by definition undergo enantiomerization reactions equivalent to reflection in a mirror plane 20, a process which is conveniently illustrated with the unevenly crossed arrow symbols as is shown in FIG. 3. In FIG. 3, the separate arrows actually represent configurations, labeled R and S, of one molecule occupying one volume of space. In order to make such molecules suitable for SA or LB monolayer assembly, aliphatic tails that may carry specific functions (connectors, cross linking elements, etc.) can be attached to an end of the molecule. The dipole arrow can then be boxed to signify the polar head group, in a similar fashion to the representation of FIG. 1. It is now seen in FIG. 4 that the non-polar aliphatic attachment can be made to one end of the molecule or to the mirror-image end of its tautomeric form to provide two sets of molecules undergoing automerizations between structural isomers (quasi-narcissistic reactions) in which the two sets have to each other the enantiomeric relationships indicated in the figure. Note that the resulting enantiomers ($R_1$, $S_2$) and ($R_2$, $S_1$) do not interconvert and that the rate constants for automerization are no longer equal although equivalent for the two pair.

Figure 5:
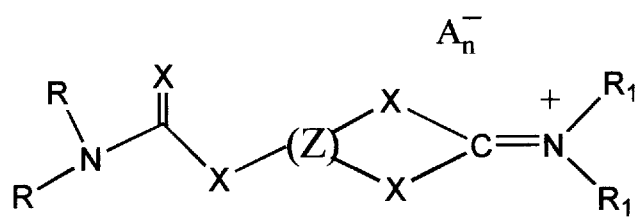
FIG. 5 depicts the general composition for a specific type of asymmetric narcissistic molecule known in the prior art.

To clarify the above specified molecular structures and their relationships with the symbols, the general composition for a specific type of asymmetric narcissistic molecule conforming to U.S. Pat. No. 5,237,067 is shown in FIG. 5. In the formula, $A_n^-$ is the anion of a strong acid, X is sulfur or selenium, R and $R_1$ are independently alkyl or cycloalkyl, unsubstituted or substituted, and (Z) represents a chiral ring-completing group of atoms that changes chirality on tautomerization. These compounds are examples of amphiphilic compounds that are advantageously employed in the practice of the present invention are based on molecules that undergo asymmetric narcissistic reactions so that the structure may be commuted between two non-centrosymmetric state.

Examples of $A_n^-$ include $PF_6^-$, $Ph_4B^-$, $Br^-$, and $Cl^-$, where Ph is phenyl. Examples of (Z) groups include —$CH_2$—CH— carbon bridge and —$CH_2$—S—CH— bridge.

Figure 4:
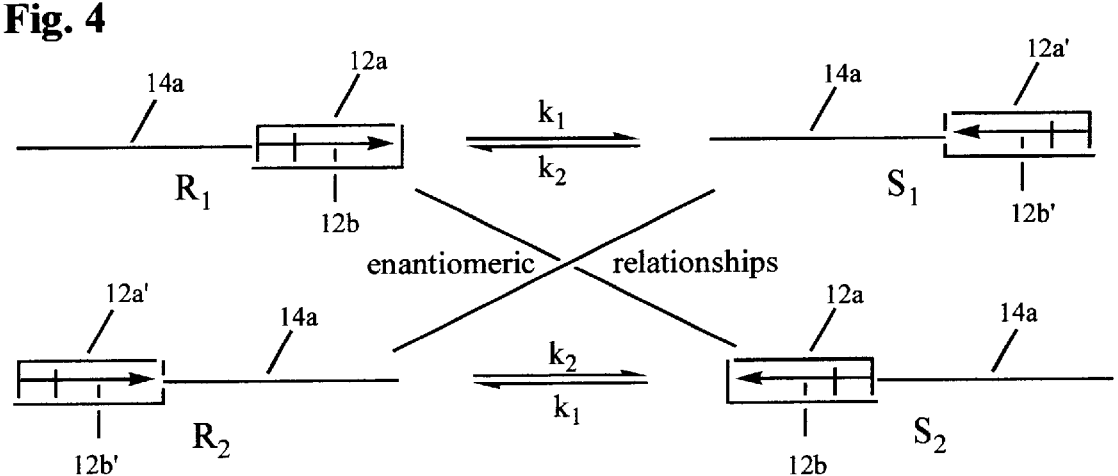
FIG. 4 is a schematic representation of molecules as in FIG. 3, in which the non-polar aliphatic attachment can be made at one end of the molecule or its mirror-image end of its tautomeric form to provide two sets of molecules which undergo automerizations.
Figure 6A:
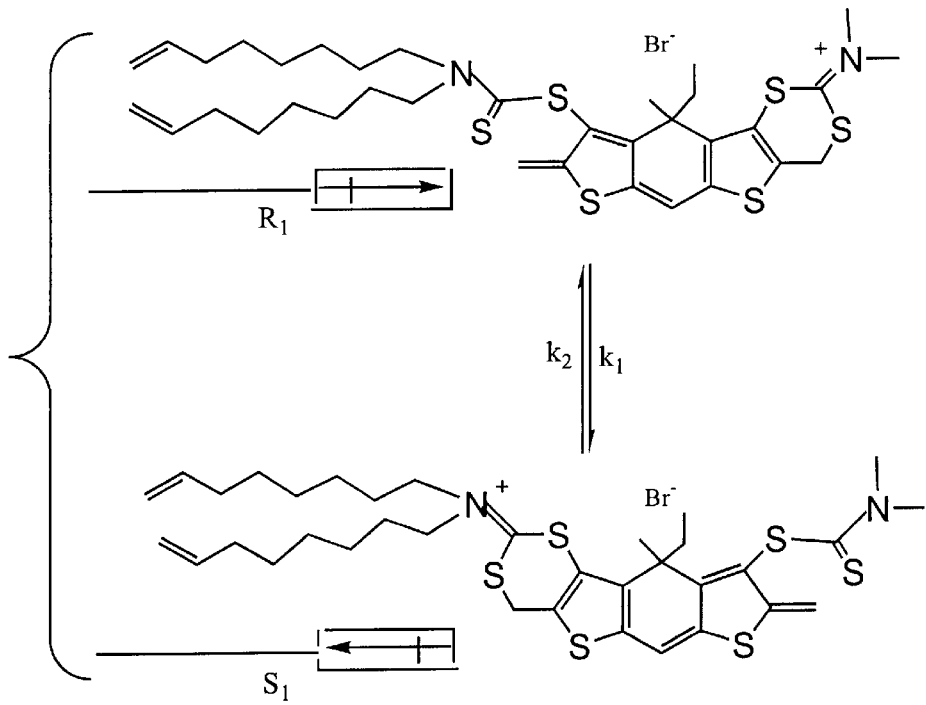
FIGS. 6A–6B depict the general composition of FIG. 5 as employed in the schematic representation of FIG. 4.
Figure 6B:
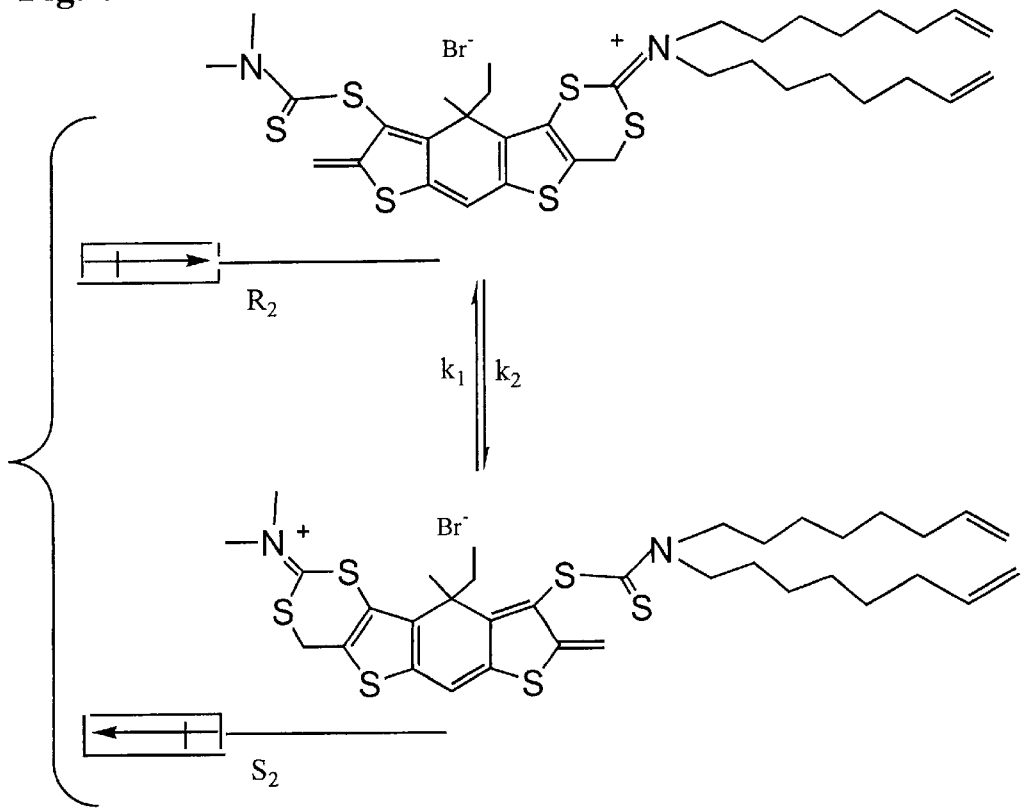

FIGS. 6A–6B depict an embodiment of the foregoing general composition into a particular amphiphilic molecular structure and display the expected automerizations of this structure and how they correspond to the adopted symbols and labels of FIG. 4. In this particular molecular example, a structure with two eight carbon aliphatic tails containing cross-linkable terminal unsaturations is shown, although just one aliphatic chain of an appropriate length may be sufficient for LB deposition. The intent of FIG. 6 is to illustrate by way of a structural example, the relationships of the symbolic representations of FIG. 4.

Figure 7:
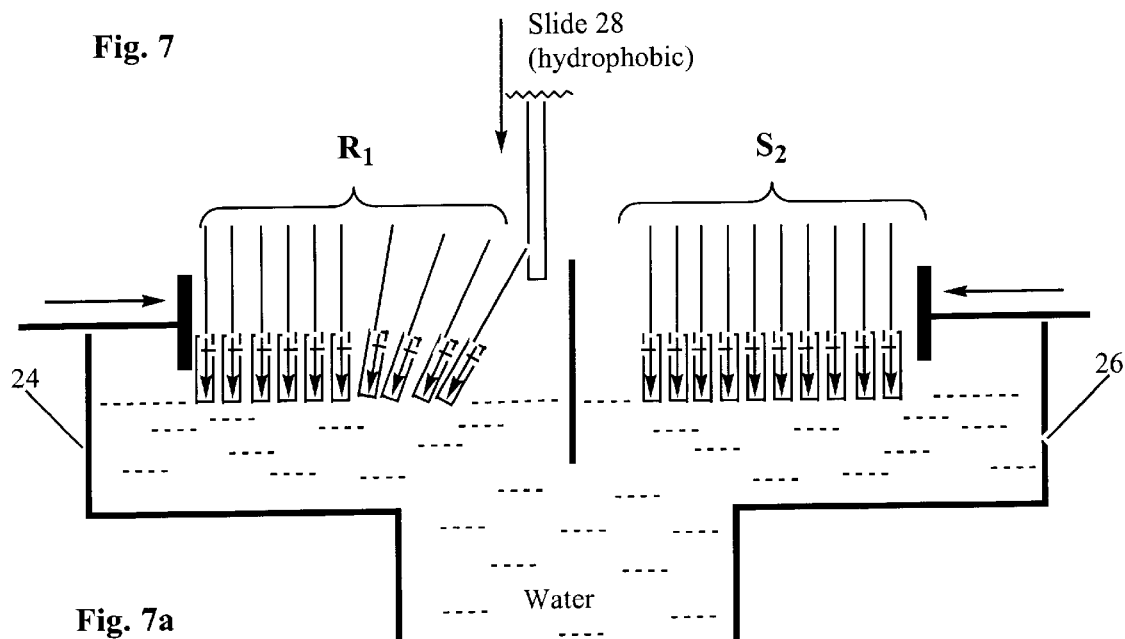
FIG. 7 depicts a process in accordance with the present invention for fabricating supermolecular structures by y-type LB deposition of alternate layers of the bistable enantiomeric amphiphiles of FIG. 4.
Figure 7A:
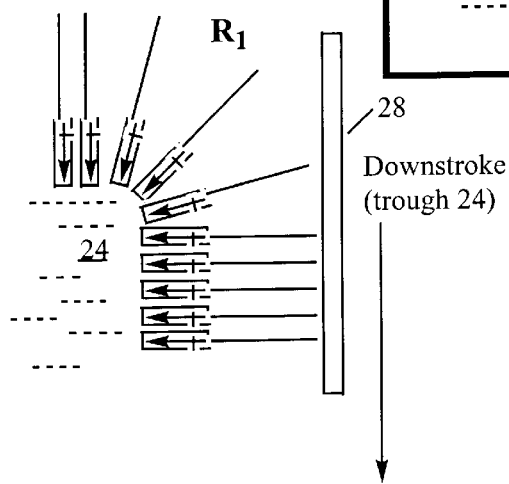
FIGS. 7A and 7B depict a portion of the process of FIG. 7, illustrating a down-stroke step (FIG. 7A) and an upstroke step (FIG. 7B)
Figure 7B:
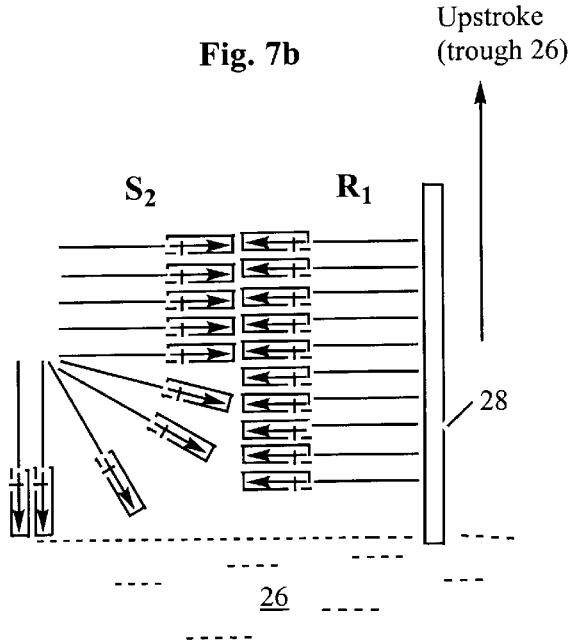

In FIG. 7 is depicted the inventive process of fabricating supermolecular structures by Y-type vertical LB deposition of alternate-layers of the bistable enantiomeric amphiphiles of FIG. 4. The LB apparatus 22 depicted in FIG. 7 has two compartments (double trough apparatus) 24, 26, where a monolayer of $R_1$ (or $S_1$ or mixtures of $R_1$, $S_1$) in the first trough 24 is kept separate from a monolayer of $S_2$ (or $R_2$ or mixtures of $S_2$, $R_2$) in the second trough 26, but share a common liquid subphase. Other methods and trough designs that may be useful for the deposition of the inventive alternate-layer structures (rotating cylinder, etc.) have also been described. As illustrated in FIG. 7A, there is deposited on the downstroke in trough 24 on a hydrophobic slide 28 a layer of a $R_1$ tautomer and after transfer of the slide in the liquid subphase, the deposition on the upstroke in trough 26 a layer of a $S_2$ tautomer to form a bilayer structure, as shown in FIG. 7B. This bilayer deposition process may then be repeated in a cyclic manor to build up multilayer structures of the novel alternate-enantiomer composition. Such a specific alternate-enantiomer deposition process could as well begin with deposit of an initial monolayer of $S_2$ on the downstroke in trough 2 or, by using a hydrophilic slide, on an upstroke in either trough as is known in the art of Y-type vertical LB film deposition.

Figure 8A:
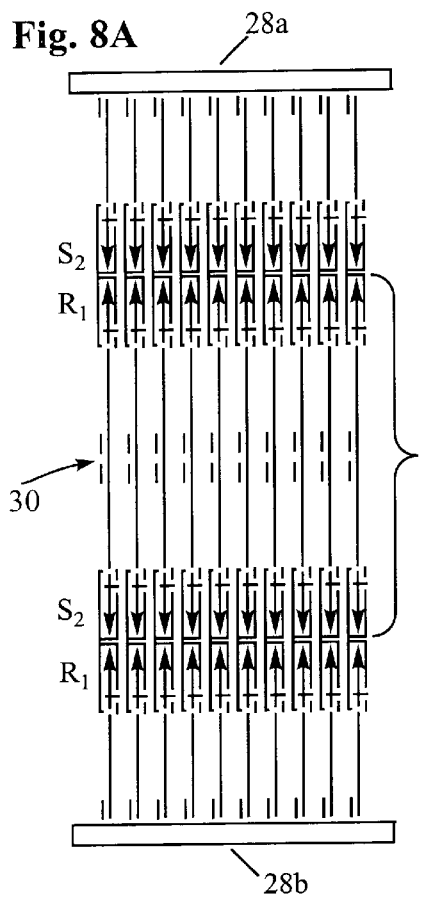
FIG. 8A depicts a preferred alternate-enantiomer multi-layer deposition configuration in accordance with the present invention.

In FIG. 8A is shown a preferred inventive alternate-enantiomer multilayer disposition (configuration) based on the above described deposition of $R_1$–$S_2$ bilayers (Y-type or

film structures). The configuration shown is a sandwich-type structure 30 formed between two substrates (e.g., slides) 28a, 28b which could be constructed by separate multilayer depositions on two substrates that are then sandwiched together, or by capping a multilayer film deposited on a single substrate. As a second preferred configuration, such an inventive multilayer structure could as well contain intervening layers (Y-type or

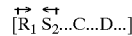

where the inventive multilayer structures

are separated and defined by deposited layers [C . . . D . . .] that may have specific properties or serve various device functions, for example as cladding (for waveguide structures) or as conducting or as insulating layers and so forth, for a particular application of the inventive composition. These intervening layers thus provide for layered domains of the inventive configuration within a more complex supramolecular device architecture.

The intervening layer(s) may comprise an insulating material, such as an insulating organic polymer. Examples of suitable insulating organic polymers include fatty acid polymers and polyimides. Alternatively, the intervening layer(s) may comprise an electrically conducting material, such as a conducting organic polymer. Examples of suitable electrically conducting polymers include polythiophene and polypyrrole. Yet alternatively, the intervening layer(s) may comprise a material having a lower index of refraction, thereby serving as a cladding layer for light traveling through the bilayer structure. Examples of suitable cladding layers include organic polymers such as fatty acid polymers and polyimides.

The thickness of the intervening layer(s) is typically within the range of about 0.2 to 2 µm.

In application, this 'multi-layered cake' structure may function as a three-dimensional memory or computational device in which each separate layer is addressed via slab waveguides while being written and read with perpendicular informational light beams.

Figure 8B:
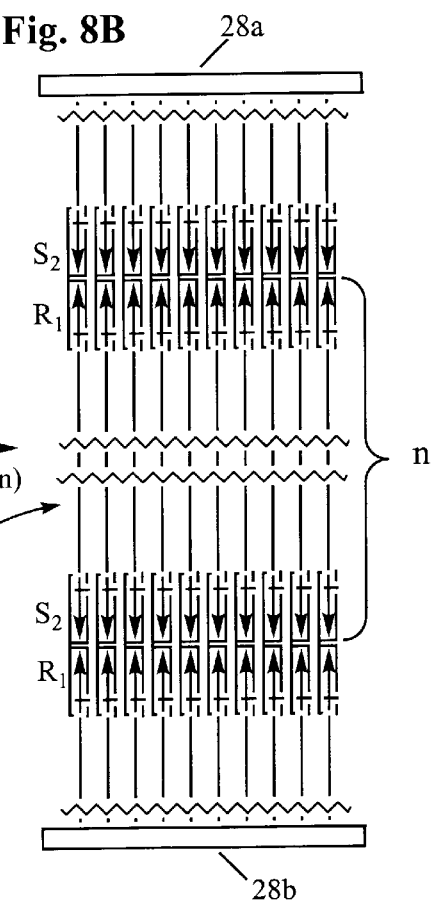
FIG. 8B depicts the resulting structure achieved by UV irradiation of the configuration of FIG. 8A.

As indicated in FIG. 8B, once deposited, the final multi-layer LB structure

or those parts of the more complex structures

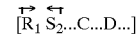

are to be fixed permanently in the inventive configuration 32. In the example of FIG. 8, this is accomplished by cross-linking terminal double-bonds of the aligned aliphatic chains, a known process which may be induced by ultra-violet (UV) irradiation. Other methods for stabilizing deposited LB multilayer structures (condensations, additions etc.) are known and the fixation process in general has been represented by the horizontal wavy lines of FIG. 8B.

In application, the monolithic bilayer structure may serve either as a high speed, high resolution display device medium or as a high density, two-dimensional storage device, for example.

Figure 9A:
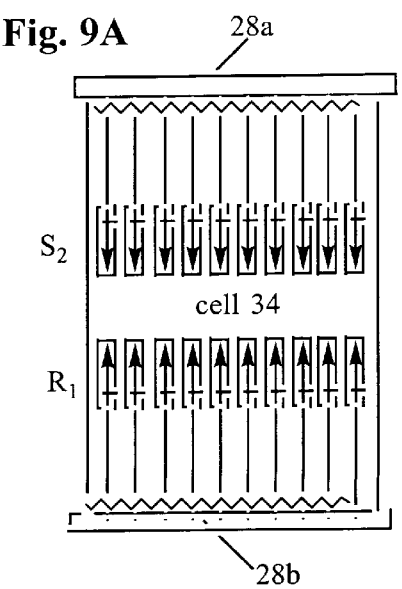
FIG. 9A depicts yet another preferred configuration in accordance with the present invention, involving monolayers deposited on opposing but separate surfaces to form a cell.
Figure 9B:
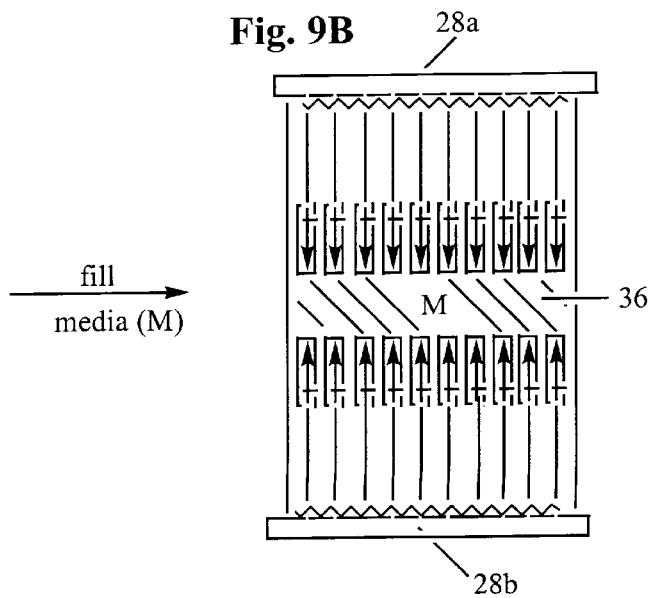
FIG. 9B depicts the resulting structure achieved by filling the cell with a medium that interacts with the surface of both monolayers in the configuration of FIG. 9A.

In FIG. 9A is depicted a third preferred inventive configuration in which a monolayer of $R_1$ and a monolayer of $S_2$ are deposited and fixed (again indicated by the horizontal wavy lines) on two opposing but separate surfaces 28a, 28b that form a cavity or cell 34. These separate monolayers may be formed by SA or LB techniques and fixed by covalent linkages to the substrates or by cross-linking the deposited layers. As indicated in FIG. 9B, the cell so constructed may subsequently be filled with a medium, M, 36 which interacts with the surface of both monolayers

Examples of possible interactive filling media, [M] are liquid crystalline materials and optically active biological solutions.

In application, this cellular structure could be filled with a liquid crystalline or an optically active biological solution. The effect of chirality on a liquid crystal is known in the art. In this way, a liquid crystalline switch may be constructed that is controlled via the device media. On the other hand, when filled with optically active solutions, this same cell may function as a delicate sensor—via measurement of chiral interactions—for various biological materials.

The common element of all of the inventive compositions is that one layer of an enantiomeric form of the amphiphilic molecule [$R_1$] or its tautomeric form [$S_1$] or combinations of the two, are matched (paired) with a corresponding layer of the enantiomeric form [$S_2$] or its tautomeric form [$R_2$] or combinations of the two. An advantage of having mixtures of tautomeric forms might be the prevention of aggregates such as 'H' or 'J' structures, islands, crystallites etc. that may otherwise form on the LB interface although the stability of the multilayer depositions remains the overriding consideration.

Figure 10A:
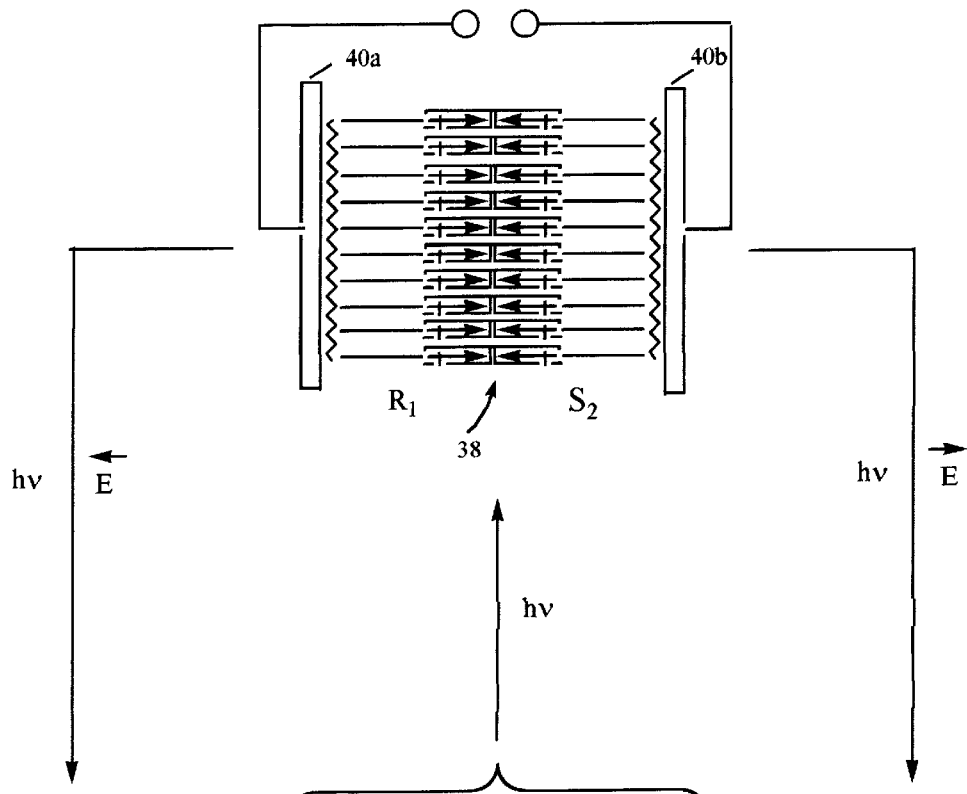
FIGS. 10A–C depict a device in which a bilayer composition is sandwiched between transparent electrodes, with FIG. 10A depicting the bilayer structure in the macroscopic racemic state produced by irradiation in the absence of an imposed electric field and FIGS. 10B and 10C depicting the two optically antipodal states produced on equivalent irradiation of the structures in the presence of equal electric fields of opposite polarity.
Figure 10B:
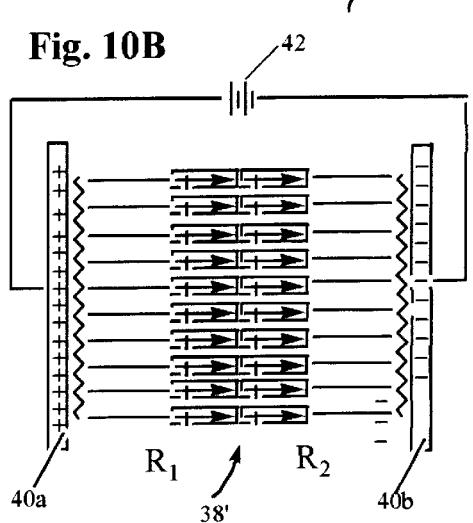
Figure 10C:
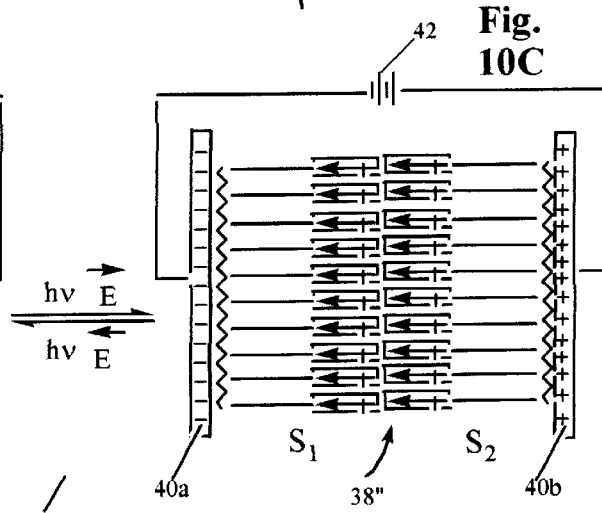

The inventive architectural configuration provides three unique switchable states in which switching is triggered by light and controlled by an electric field as illustrated in FIG. 10. The switching process has previously been described for a general composition of an asymmetric narcissistic molecule by U.S. Pat. No. 5,237,067. In FIG. 10, an inventive bilayer composition 38 is depicted sandwiched between transparent electrodes 40a, 40b (e.g., ITO (indium tin oxide)-coated slides or transparent field-effect transistors) to afford a capacitor-type structure. In FIG. 10A, the bilayer structure 38 is depicted in the macroscopic racemic state produced by irradiation in the absence of an imposed electric field and also, to simplify the drawing, all of one layer is depicted in the $R_1$ form and all of the other layer in the $S_2$ form (the initial layered state), although after irradiation there is expected to be produced a racemic tautomeric mixture ($R_1+S_1$) and ($S_2+R_2$) where the proportions of the tautomers are related to the equilibrium constants $k_1$ and $k_2$ of FIG. 4. In FIGS. 10B and 10C are depicted the two optically antipodal states 38', 38" produced on equivalent irradiation of the structures in the presence of equal electric fields 42 of opposite polarities. Again for simplicity, both layers 38', 38" are depicted as completely switched into one stereoisomeric form, although tautomeric mixtures having an enantiomeric excess of R forms over S forms (scalemic mixture) will exist for FIG. 10B and an equivalent enantiomeric excess (scalemic mixture) of S forms over R forms will exist for FIG. 10C.

The invention now being fully described, has provided a method of assembly of asymmetric narcissistic molecules into supramolecular architectures that can be commuted between three optical states, two of which are scalemic mixtures that produce equal valued but oppositely signed chiroptical effects and a third intermediate state that is racemic.

Thus, there has been disclosed an architecture for assembly of one or more optoelectronic devices based on asymmetric narcissistic molecules. It will be readily apparent to those skilled in this art that various changes and modifications of an obvious nature may be made, and all such changes and modifications are considered to fall within the scope of the present invention, as defined by the appended claims.

What is claimed is:

1. An opto-electronic device comprising at least one two-sided monolayer structure comprised of amphiphilic compounds that are based on molecules that undergo asymmetric narcissistic reactions so that said structure may be commuted between two non-centrosymmetric states.

2. The device of claim 1 wherein said amphiphilic compounds are selected from molecules having the structure

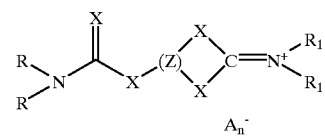

where $A_n^-$ is the anion of a strong acid, X is sulfur or selenium, R and $R_1$ are independently alkyl or cycloalkyl, unsubstituted or substituted, and (Z) represents a chiral ring-completing group of atoms that changes chirality on tautomerization.

3. The device of claim 2 wherein $A_n^-$ is selected from the group consisting of $PF_6^-$, $Ph_4B^-$, $Br^-$, and $Cl^-$, where Ph is phenyl, and wherein (Z) is selected from the group consisting of —$CH_2$—CH— carbon bridge and —$CH_2$—S—CH— bridge.

4. The device of claim 1 further comprising a pair of transparent electrodes sandwiching said structure, with electrical contacts to said pair of transparent electrodes and at least one insulating layer between each transparent electrode and said structure.

5. An opto-electronic device comprising at least one bilayer structure comprising amphiphilic compounds that are based on molecules that undergo asymmetric narcissisic reactions so that said structure may be commuted between two non-centrosymmetric states.

6. The device of claim 5 comprising at least two bilayer structures, each structure separated from an adjacent structure by at least one intervening layer.

7. The device of claim 6 wherein said at least one intervening layer comprises an insulating organic material.

8. The device of claim 7 wherein said insulating organic material is selected from the group consisting of fatty acid polymers and polyimides.

9. The device of claim 6 wherein said at least one intervening layer comprises an electrically conducting material.

10. The device of claim 9 wherein said electrically conducting material is selected from the group consisting of polythiophene and polypyrrole.

11. The device of claim 6 wherein said at least one intervening layer comprises a cladding material having a lower index of refraction than that of said bilayer structure.

12. The device of claim 6 wherein said at least one intervening layer has a thickness ranging from about 0.2 to 2 micrometers.

13. The device of claim 5 wherein said amphiphilic compounds are selected from molecules having the structure

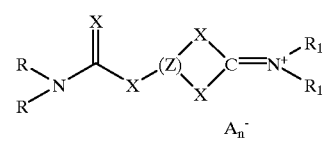

where $A_n^-$ is the anion of a strong acid, X is sulfur or selenium, R and $R_1$ are independently alkyl or cycloalkyl, unsubstituted or substituted, and (Z) represents a chiral ring-completing group of atoms that changes chirality on tautomerization.

14. The device of claim 13 wherein $A_n^-$ is selected from the group consisting of $PF_6^-$, $Ph_4Br^-$, $Br^-$, and $Cl^-$, where Ph is phenyl, and wherein (Z) is selected from the group consisting of —$CH_2$—CH— carbon bridge and —$CH_2$—S—CH— bridge.

15. The device of claim 5 further comprising a pair of transparent electrodes sandwiching said structure, with electrical contacts to said pair of transparent electrodes and at least one insulating layer between each transparent electrode and said structure.

16. A method of fabricating an opto-electronic device comprising at least one two-sided monolayer structure comprised of amphiphilic compounds that are based on molecules that undergo asymmetric narcissistic reactions that alternate between two non-centrosymmetric states, said method comprising (a) coating a major surface of each of two substrates with said at least one monolayer and (b) placing each major coated surface in opposed facing contact.

17. The method of claim 16 wherein said amphiphilic compounds are selected from molecules having the structure

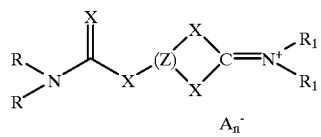

where $A_n^-$ is the anion of a strong acid, X is sulfur or selenium, R and $R_1$ are independently alkyl or cycloalkyl, unsubstituted or substituted, and (Z) represents a chiral ring-completing group of atoms that changes chirality on tautomerization.

18. The method of claim 17 wherein $A_n^-$ is selected from the group consisting of $PF_6^-$, $Ph_4B^-$, $Br^-$, and $Cl^-$, where Ph is phenyl, and wherein (Z) is selected from the group consisting of —$CH_2$—CH— carbon bridge and —$CH_2$—CH— bridge.

19. The method of claim 16 wherein said structure is formed by (a) coating each said transparent electrode with at least one insulating layer, (b) assembling a said monolayer on each of said coated transparent electrodes; and (c) providing each said transparent electrode with electrical contacts, thereby forming a cell.

20. The method of claim 16 wherein said device is formed on separate substrates by first forming a first monolayer of said amphiphilic compound on said first substrate and then forming an additional monolayer of an enantiomer of said amphiphilic compound on said second substrate to thereby form said two-sided monolayer structure.

21. A method of fabricating an opto-electronic device comprising at least one bilayer structure comprised of amphiphilic compounds that are based on molecules that undergo asymmetric narcissistic reactions so that the structure may be commuted between two non-centrosymmetric states, said method comprising forming said at least one bilayer structure on a major surface of a substrate.

22. The method of claim 21 wherein said device comprises at least two bilayer structures, wherein each structure is separated from an adjacent structure by at least one intervening layer.

23. The method of claim 22 wherein said at least one intervening layer comprises an insulating organic material.

24. The method of claim 23 wherein said insulating organic material is selected from the group consisting of fatty acid polymers and polyimides.

25. The method of claim 22 wherein said at least one intervening layer comprises an electrically conducting material.

26. The method of claim 25 wherein said electrically conducting material is selected from the group consisting of polythiophene and polypyrrole.

27. The method of claim 22 wherein said at least one intervening layer comprises a cladding material having a lower index of refraction than that of said bilayer structure.

28. The method of claim 22 wherein said insulator layer has a thickness ranging from about 0.2 to 2 $\mu$m.

29. The method of claim 21 wherein said amphiphilic compounds are selected from molecules having the structure

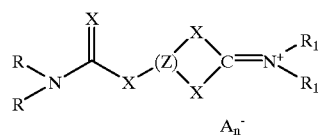

where $A_n^-$ is the anion of a strong acid, X is sulfur or selenium, R and $R_1$ are independently alkyl or cycloalkyl, unsubstituted or substituted, and (Z) represents a chiral ring-completing group of atoms that changes chirality on tautomerization.

30. The method of claim 29 wherein $A_n^-$ is selected from the group consisting of $PF_6^-$, $Ph_4B^-$, $Br^-$, and $Cl^-$, where Ph is phenyl, and wherein (Z) is selected from the group consisting of —$CH_2$—CH— carbon bridge and —$CH_2$—S—CH— bridge.

31. The method of claim 21 wherein said structure is formed between two transparent electrodes, one of said transparent electrode serving as said substrate.

32. The method of claim 31 wherein said structure is formed by (a) coating each said transparent electrode with at least one insulating layer, (b) assembling said bilayer structure on said coated transparent electrode;

(c) placing said other coated transparent electrode on said bilayer structure; and (d) providing each said transparent electrode with electrical contacts, thereby forming a cell.

33. The method of claim 21 wherein said device is formed on said substrate by first forming a first monolayer of said amphiphilic compound on said substrate and then forming a second monolayer of an enantiomer of said amphiphilic compound on said first monolayer to thereby form said bilayer structure.

* * * * *